Patented Oct. 25, 1938

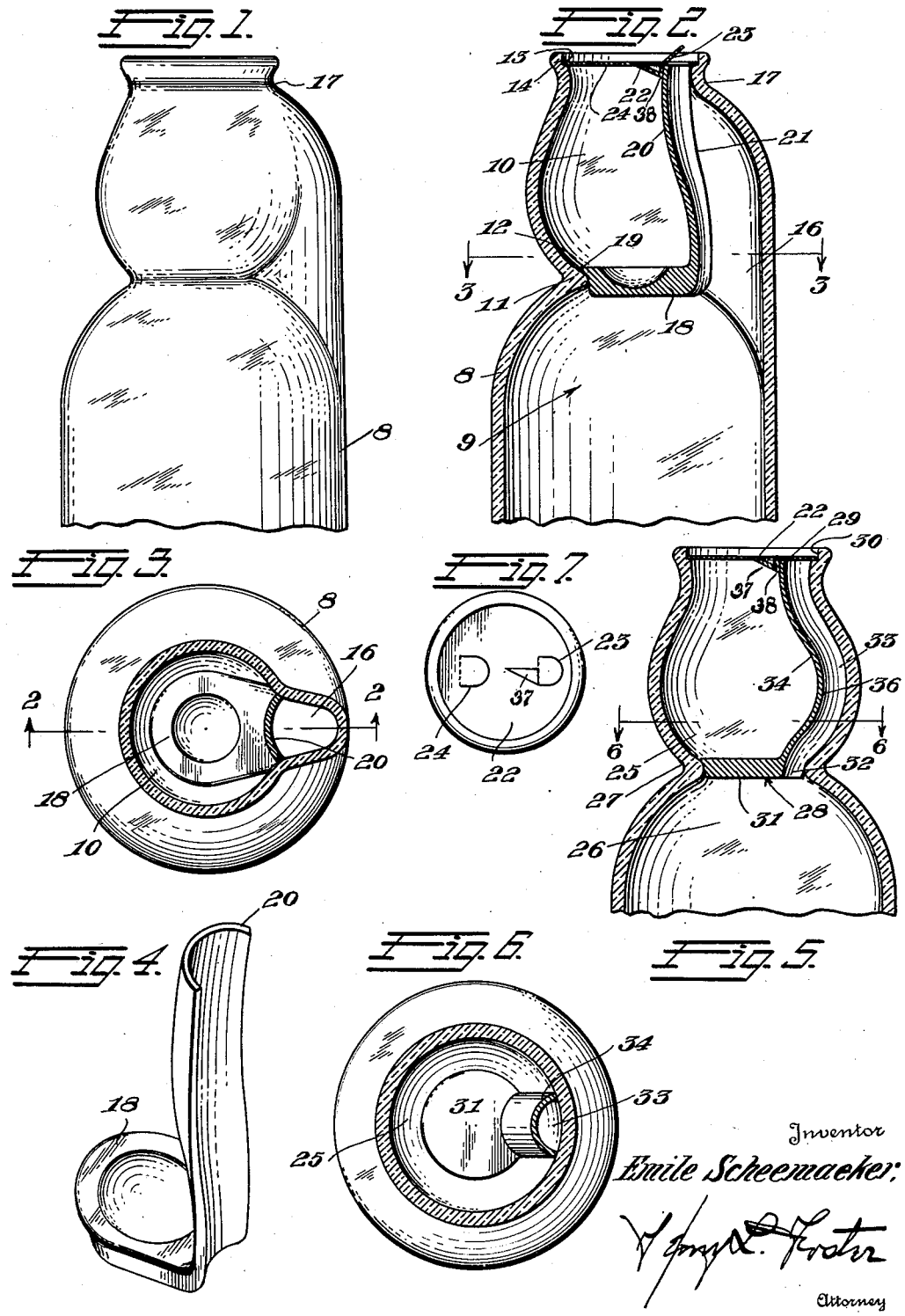

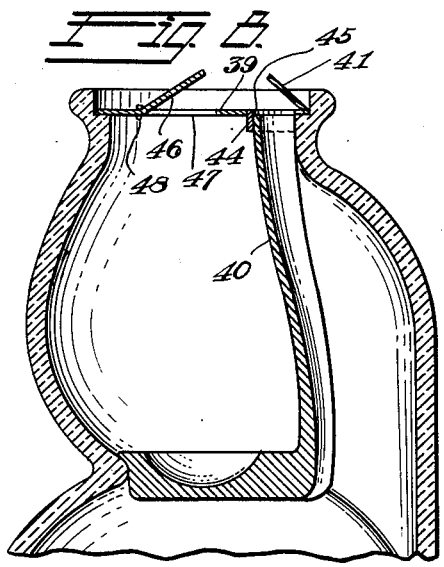
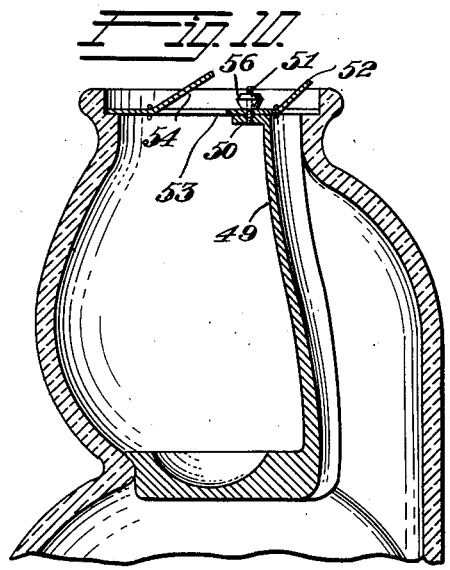
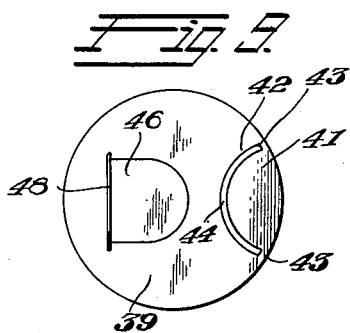
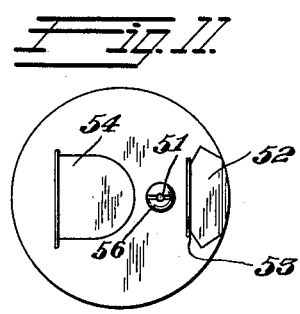
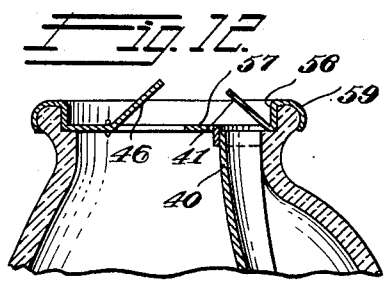

2,134,090

UNITED STATES PATENT OFFICE 2,134,090

CREAM SEPARATING DEVICE

Emile Scheemaeker, Blackstone, Mass.

Application December 2, 1937, Serial No. 177,829

8 Claims. (Cl. 210—51.5)

The present invention relates to cream separating devices for milk bottles, and more particularly to devices of the type that enables cream or milk to be selectively withdrawn from the same bottle at the option of the user.

United States Patent No. 2,075,665 to Emile Scheemaeker discloses a device of this general type. The device of that patent is a separator that is mounted in a modified milk bottle having an inwardly open passage at one side of the upper portion of the bottle, the separator acting to close off the passage from the interior of the bottle, and being held in position across the open side of the passage by means of guides formed in the walls of the bottle along the sides of the passage, and with which the edges of the separator are slidably engaged. While the device of the patent is entirely practical for the accomplishment of its intended purpose, the formation of the guides at the sides of the passage presents a difficulty in the manufacture of the bottles. Another difficulty that has been encountered with the structure disclosed by the patent in question arises from the fact that dairies make use of automatic bottling and capping machines that are constructed to operate upon milk bottles having mouth portions that are of standard round shape and size. The use of a bottle having a modified form of top and mouth, as disclosed by the said patent, would require the adaptation of the machinery to such type bottles.

The invention of the present application overcomes these difficulties by providing a form of separator the use of which does not require guides formed in the walls of the bottle, and which may be used in a bottle having a top and mouth that are standard as to size and shape.

The chief object of the invention is to provide a novel form of cream separating device of the type above mentioned, that may be used in a bottle having a standard mouth and top, and in which no modification of the inner surfaces of the bottle is necessary to hold the separator in position in the bottle.

Another object is to provide a simple form of separator that is easily and simply manufacturable in a variety of ways and of a variety of materials.

Still another object is to provide a novel form of separator that is capable of use with a milk bottle of the standard type having a cream chamber at its top and connected with the body portion of the bottle by a necked-in portion.

A still further object is to provide a novel form of separator so constructed as to cooperate with the inner surface of a milk bottle to be held in place by the curve of such surface.

Another object is to provide a novel form of milk bottle especially adapted to use with the type of separator described herein.

Yet another object is the provision of a novel form of milk bottle cap adapted to cooperate with separators of the type in question.

In the accompanying drawings:

Figure 1 is a side elevation of a modified form of milk bottle that is adapted for use with the separator of the invention.

Figure 2 is a sectional elevation of the type of bottle shown in Figure 1, showing the separator mounted in the bottle.

Figure 3 is a sectional view on the line 3—3 of Figure 2.

Figure 4 is a perspective view of the type of separator for use with the type of bottle of Figures 1 and 2.

Figure 5 is a sectional view showing a modified form of separator for use with a milk bottle of standard type, the separator being shown in position in such a bottle.

Figure 6 is a sectional view on the line 6—6 of Figure 5.

Figure 7 is a top plan view of the mouth of a milk bottle, and a cap that may be used with the separator.

Figure 8 is an enlarged sectional view of a modified form of cap.

Figure 9 is a plan view of the cap shown in Figure 8.

Figure 10 is an enlarged sectional view of another modified form of cap.

Figure 11 is a top plan view of the cap shown in Figure 10.

Figure 12 is a sectional view of another modified form of cap.

Describing the drawings more particularly, and referring first to Figures 1 to 3, a modified form of milk bottle 8 is provided with a milk chamber 9 in its lower portion, and a cream-receiving chamber 10 above the milk chamber from which it is separated by a necked-in portion 11. An opening 12 connects the two chambers. The cream chamber 10 has a mouth 13 that is also the mouth of the bottle, and that is surrounded by an annular seat 14 for receiving a cap to close the bottle. The wall surrounding the mouth 13, and the seat 14, are so formed as to conform in size and shape to the standards of similar parts of standard milk bottles.

From the upper portion of the milk chamber 9, a passage-forming channel 16, formed in the wall of the bottle, extends upward through the necked-in portion and alongside the cream chamber to a point, as at 17, spaced below the mouth of the milk bottle. The channel 16 is inwardly open, and may be formed as shown in Figure 2 by an outwardly extending, substantially U-shaped rib in the wall of the bottle. At its upper end the channel 16 merges into the inner surface of the bottle wall, the sides merging into the wall of the cream chamber to leave an unaltered surface of the inner wall between the end of the channel and the mouth. This feature of terminating the channel at a point below the mouth of the bottle permits the top and mouth to be made according to usual specifications for such bottles.

The separator, best illustrated in Figure 4, comprises a bottom wall 18 of suitable size and shape to close the opening 12, but to leave the channel 16 unobstructed. Preferably the edge of the wall 18 is provided with an outwardly extending flange 19 that seats upon the upper inner surface of the necked-in portion 11 and prevents the separator wall 18 from tipping down through the opening.

Upstanding from the wall 18 is a transversely curved passage-forming wall 20 of proper width to engage the walls of the channel 16 throughout its extent, and to close off the channel from the cream chamber 10. The wall 20 is longitudinally curved, as shown in Figure 2, so that its edges engage the inner surface of the wall of the chamber 10 throughout the distance from the end of the channel 16 to the mouth of the bottle. Due to the transverse curve of the wall 20, a passage is set off between the end of the channel and the mouth of the bottle, this passage being a continuation of that formed by the channel and the lower part of the wall 20. A passage extending from the milk chamber 9 to the mouth 13 of the bottle is thus provided.

The longitudinal curve of the wall 20 has a purpose further than that of closing off the passage by having its edges in contact with the inner surface of the wall of the bottle. Reference to Figure 2 shows that from the point 17 at which the channel 16 terminates, the wall of the cream chamber bulges outward. The edges of the wall 20 follow this outward curve, and therefore a portion of these outwardly curving edges underlies the outwardly bulging wall of the cream chamber. This underlying engagement of the edges of the wall 20 with the outwardly curving bottle wall serves to lock the separator against unwanted movement toward the mouth of the bottle when the latter is upturned in pouring out its contents. As will be later described, means may be provided also for preventing lateral motion of the wall 20 away from the wall of the bottle.

The separator may be inserted into a bottle of milk by arranging the wall 18 in a substantially vertical position and extending downwardly from the wall 20 which will be nearly horizontal. In this position the wall is lowered into the bottle until it strikes the necked-in portion, the device being turned during the lowering until the walls 18 and 20 are respectively in nearly horizontal and vertical positions. The separator is brought to its final mounted position by swinging the wall 20 toward the wall of the bottle, this motion resulting in the underlying engagement of its lower portion with the wall of the cream chamber, as above described. The only way in which the separator can be removed is by swinging the wall 20 away from the wall of the bottle sufficiently to release its lower portion from its underlying engagement with the wall of the cream chamber.

A cap is illustrated in Figures 2 and 7, the said cap being shown in mounted position in the mouth of a bottle. The cap comprises a disk-like body 22 that is engaged in the seat 14 of the bottle mouth. The cap is provided with valve devices that may advantageously take the form of flaps 23 and 24, cut from the material of the disk on three sides, and overlying respectively areas of the milk passage and the cream chamber. The flaps are hinged on the uncut sides to the disk, and may be turned back to provide openings through which the milk and cream contained in the bottle may be poured. The wall 20 of the separator terminates at the under surface of the cap, and is in contact with the surface to close off the passage and also to secure the separator in position.

The manner of use of the assembly above described will be obvious. If it be assumed that the bottle illustrated in Figure 2 contains milk from which the cream has risen into the cream chamber, it will be seen that the cream in the chamber is separated from the milk in the milk chamber by the wall 18, and that the channel 16 is cut off from the cream chamber by the wall 20. If the consumer wishes to obtain cream from the bottle, he opens the flap 24 and by tipping the bottle may pour out as much of the cream as he wishes. By closing the flap 24 and opening the flap 23, he may obtain milk. The pouring of either milk or cream does not depend on the presence or absence of the other.

A modified form of the device is illustrated in Figures 5 and 6, which show a bottle of the well known standard type having a milk chamber in its lower portion and a superposed cream chamber set off from the milk chamber by a necked-in portion. The bottle disclosed in Figure 5 has a cream chamber 25 at its top, and a milk chamber 26 under the cream chamber and separated from it by a necked-in portion 27, through which is an opening 28. The cream chamber has a mouth 29 of standard shape and size, and the usual annular seat 30. For use with this type of milk bottle, the separator is provided with a bottom wall 21 that is circular and of proper size to close the opening 28. At one side of the wall 21 and lying within the periphery thereof is an opening 32 that forms the mouth of a milk passage 33. The passage 33 is set off from the cream chamber by a transversely curved wall 34, upstanding from the wall 31 about the opening 32. The wall 34 is also longitudinally curved, as best shown in Figure 5, in such a manner that its edges are curved to closely follow the curve of the inner surface of the cream chamber throughout the extent of the wall 34. By this engagement between the edges of the wall 34 and the inner surface of the wall of the cream chamber 25, the passage 33 is closed off and the outwardly bowed portion 36 of the wall 34 fits into the corresponding outwardly bulged portion of the cream chamber whereby the separator is held against motion toward the mouth of the bottle. A cap 22, similar to that shown in Figure 2 closes the bottle.

As a matter of safety, the cap 22 may be provided with means to engage the top of the separator to prevent the latter from swinging away from the wall of the bottle. In Figures 2, 5 and 7 the cap 22 is provided with an offset portion 37, bent down below the surface of the cap to form a shoulder so located as to engage the outer surface of the top of the passage-forming wall, and thereby hold the said wall in position against the wall of the bottle.

In Figure 8, a modified form of cap is shown. This cap may be made either of metal, for permanent use, or of the usual paper, for single use or for delivery with the bottle as the usual stopper. The cap comprises a circular disk 39 of the proper size to be securely engaged in the mouth of the bottle. In a position to overlie the mouth of the passage set off by the separator wall 40, here illustrated as being of the type of Figure 2 but which may obviously be of the type of Figures 5 and 6, is a tongue 41, formed by an arc-shaped cut-out 42, slightly larger than the outer periphery of the arc-shaped upper end of the wall 40, and corresponding to the curve of such top portion. In the cut-out 42, a flange 44, curved to conform to the curve of the cut-out, is engaged. The flange is equal in thickness to the width of the cut-out, and is of greater width than the thickness of the cap so that it depends below the lower surface of the cap and forms an abutment wall of proper size and curvature to engage the outer surface of the topmost portion of the wall 40 and thereby hold the said wall in its position against the wall of the bottle. The tongue 41 may be swung in a hinged fashion upon the uncut portions by which it is connected to the disk, and it cooperates with the uppermost portion 45 of the flange to close the opening when the tongue is in closed position. A second tongue 46 is cut out of the disk at a point overlying the cream chamber to form a port 47 for the passage of cream. Preferably the hinged portion of the tongue 46 is reinforced by a staple 48.

In Figures 10 and 11, a modified form of assembly is shown, the cap and separator being modified for assembly into a unit. In this modification, the upstanding wall 49 of the separator carries a flange 50 at its top and extending into the cream chamber. The upper surface of the flange, when the separator is in the bottle, lies in contact with the under surface of the cap. At a point spaced from the wall 49, the flange carries an upwardly extending threaded stud 51. The cap is provided with a valve flap 52 cut from the material of the disk 53, and that gives access to the milk passage. A valve flap 54 gives access to the cream chamber. The cap-disk 53 is provided with an opening 55 of proper size, and properly spaced, to receive the stud 51 when the device is assembled as shown in Figures 10 and 11. A nut 56 is threaded on the stud 51 and screwed down upon the upper surface of the disk 53 to hold the cap and separator in proper relative position. Due to the engagement of the cap 53 in the mouth of the bottle, the separator will be fixed in its correct position in the bottle. While this assembly is illustrated as being used with the modified bottle of Figures 1 and 2, it obviously may be used with equal advantage in the standard type of milk bottle shown in Figures 5 and 6, in which case the modified form of separator would be used as disclosed in those figures.

A different form of cap body is shown in Figure 12. The disk 57 is surrounded by an upstanding flange that closely engages the inner surface of the wall surrounding the mouth of the bottle, the flange terminating in an outwardly and downwardly extending annular flange that closely engages the outer surface of the bottle surrounding the mouth. The cap is shown as being provided with the same valve flaps 41 and 46 as is the cap of Figures 8 and 9.

The device in any of its illustrated forms is practical, since it efficiently separates the milk and cream, and permits the use of either at the option of the user. The modified bottle of Figures 1 to 3 may be manufactured by standard methods, and its standard type of top and mouth permits it to be operated upon by the present bottle filling and capping machines, and also to be cleaned by ordinary milk bottle washing machines. The form of separator of Figures 5 and 6 may be used with the present form of milk bottle that is in common use. The simplicity of the separator, comprising only the two walls, makes it inexpensive to manufacture, and its form enables it to be made of any desirable material, such as metal, glass, or rubber of the recently developed type that may be used in contact with milk without imparting undesirable taste or odor to the milk.

From the foregoing, it is thought that the construction, operation, and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim is:

1. A cream separator device for use with a milk bottle of the type having a milk chamber, a cream chamber in superposed relation to the milk chamber and having a centrally outwardly bulged wall, and a necked-in portion between the chambers and having an opening connecting the chambers, the said separator device comprising a bottom wall for closing the opening in the necked-in portion, and an upstanding passage-forming wall at one side of the bottom wall, the said passage-forming wall being transversely curved to form a channel, and its edges being longitudinally curved to conform to the curve of the outwardly bulged wall of the cream chamber, and the bottom wall having an opening underlying the passage formed by the channel of the passage-forming wall.

2. The combination with a milk bottle having a milk chamber, a superposed cream chamber having a centrally outward bulge, and a necked-in portion between the two chambers and having an opening connecting the said chambers, of a separating device comprising a bottom wall seated upon the necked-in portion to close the opening, and a transversely curved passage-forming wall carried by the bottom wall at one side and extending upwardly to the mouth of the bottle, the edges of the transversely curved wall being longitudinally curved to conform to, and engaged throughout their length with the outwardly bulged wall of the cream chamber, and a cap closing the mouth of the bottle and having openings overlying respectively the cream chamber and the passage set off by the passage-forming wall, and valves for closing the said openings.

3. The combination with a milk bottle having a milk chamber, a cream chamber in superposed relation to the milk chamber, and having a mouth that is standard in size and shape, a necked-in portion separating the milk and cream chambers and having therethrough an opening connecting the said chambers, and an inwardly open channel in the wall of the bottle and opening at one end into the milk chamber and extending upwardly through the necked-in portion at one side of the opening and along the wall of the cream chamber to a point spaced below its mouth, of a separator device having a bottom wall engaging the necked-in portion to close the opening therethrough, and an upstanding side wall extending from the bottom wall upwardly to the mouth of the bottle, the said wall being longitudinally curved to conform to the outwardly bulged wall of the cream chamber, the edges of the wall engaging the wall of the cream chamber at opposite sides of the channel throughout the extent of the latter, the side wall being transversely curved at least from the point at which the channel terminates to the mouth of the bottle, and a cap engaged in the mouth of the bottle and having selectively operable valve devices overlying respectively areas of the passage set off by the wall and the cream chamber.

4. The combination with a milk bottle having a milk chamber, a superposed cream chamber having a centrally bulged wall, and a necked-in portion between the chambers and having therethrough an opening connecting the chambers, of a separating device comprising a bottom wall engaged with the necked-in portion about the opening, and a transversely curved passage-forming wall carried by the bottom wall at one side thereof and extending upwardly to the mouth of the bottle, the edges of the passage-forming wall being longitudinally curved to conform to, and engaging, the inner surface of the outwardly bulged wall of the cream chamber throughout the extent of the said wall, and a cap closing the mouth of the bottle and having openings overlying respectively areas of the cream chamber and the passage set off by the passage-forming wall, valve devices for closing the openings, and an abutment member carried by the cap and engaging the passage-forming wall to hold it against the wall of the cream chamber.

5. The combination with a milk bottle comprising a milk chamber, a cream chamber in superposed relation to the milk chamber, and a necked-in portion between the chambers and having an opening therethrough, the said cream chamber having an outwardly bulged wall, of a separating device comprising a bottom wall engaging the necked-in portion and closing the opening, the said bottom wall having an opening therethrough adjacent one of its sides, a transversely curved wall surrounding the opening and extending along the wall of the bottle to form a passage to the mouth of the bottle, the edges of the wall being longitudinally curved to conform to, and engaging, the bulged wall of the cream chamber throughout their length, and a flange carried by the transversely curved wall at its upper end, the said flange having a flat upper surface for cooperation with the under surface of a cap engaged in the mouth of the bottle, a stud extending upwardly from the said surface, and a cap engaged in the mouth of the bottle and having an opening through which the stud passes, the said cap having openings that respectively overlie areas of the passage and the cream chamber, and valve devices closing the openings.

6. A milk bottle for use with a cream separating device, the said bottle comprising a milk chamber, a cream chamber in superposed relation to the milk chamber and provided with a mouth, a necked-in portion between the said chambers and having therethrough an opening connecting them, the wall of the bottle having at one side an inwardly open passage-forming channel, the said channel opening at one end into the milk chamber and passing upwardly through the necked-in portion and alongside the cream chamber to a point spaced below the mouth of the cream chamber.

7. A milk bottle cap for use with a milk bottle having mounted therein a separating device including means for dividing the bottle into upper and lower chambers and a passage-forming wall extending upwardly adjacent one wall of the bottle from the lower chamber to the mouth of the bottle and engaging the wall of the bottle throughout its extent, the said cap comprising a disk-like body for closing the mouth of the bottle and having openings that respectively overlie areas on opposite sides of the passage-forming wall when the cap is engaged in the mouth of the bottle, valve devices for closing the openings, and a depending abutment member carried by the cap for engaging the passage-forming wall to hold it in position against the wall of the bottle.

8. A milk bottle cap for use with a milk bottle having mounted therein a separating device including a wall for dividing the bottle into upper and lower chambers and a transversely curved passage-forming wall extending upwardly from the dividing wall to the mouth of the bottle and having its edges in contact with the inner surface of the bottle throughout their extent, the said cap comprising a disk-like body for closing the mouth of the bottle and having openings located to overlie areas upon opposite sides of the passage-forming wall when the cap is engaged in the mouth of the bottle, valve devices for closing the openings, and an abutment member depending from the under surface of the cap and having a curved surface disposed toward the passage-forming wall when the cap is so engaged in the mouth of the bottle for engaging the outer surface of the pasage-forming wall at its top to hold the said wall against the wall of the bottle.

EMILE SCHEEMAEKER.